(12) United States Patent
Noetzelmann et al.

(10) Patent No.: US 8,165,863 B2
(45) Date of Patent: Apr. 24, 2012

(54) VISUALIZATION METHOD FOR ELECTRICAL MACHINE OPERATION MODELS BASED ON MECHANICAL MACHINE OPERATION MODELS

(75) Inventors: Oswin Noetzelmann, Monmouth Junction, NJ (US); Rainer Heller, Eckental (DE); Dirk Schaumburg, Friedberg (DE)

(73) Assignee: Siemens Corporation, Iselin, NJ (US)

( * ) Notice: Subject to any disclaimer, the term of this patent is extended or adjusted under 35 U.S.C. 154(b) by 400 days.

(21) Appl. No.: 12/547,015

(22) Filed: Aug. 25, 2009

(65) Prior Publication Data

US 2010/0063792 A1     Mar. 11, 2010

Related U.S. Application Data

(60) Provisional application No. 61/095,997, filed on Sep. 11, 2008.

(51) Int. Cl.
*G06F 17/50* (2006.01)
(52) U.S. Cl. .......................................... 703/13
(58) Field of Classification Search ..................... 703/13
See application file for complete search history.

(56) References Cited

U.S. PATENT DOCUMENTS

| 5,177,420 A | 1/1993 | Wada et al. |
| 7,315,305 B2 * | 1/2008 | Crotty et al. .................. 345/440 |
| 2004/0254653 A1 | 12/2004 | Eichhorn et al. |
| 2008/0120532 A1 | 5/2008 | Lange et al. |

FOREIGN PATENT DOCUMENTS

| EP | 0 177 396 A1 | 2/2001 |
| WO | 2009/105797 A1 | 9/2009 |

OTHER PUBLICATIONS

European Search Report dated Dec. 18, 2009.

* cited by examiner

*Primary Examiner* — Dwin M Craig
*Assistant Examiner* — Andre Pierre Louis

(57) ABSTRACT

A visualization of an electrical machine operation model of logic controller behavior is displayed on a display such as a two-dimensional computer display. The display includes separate spaces representing separate devices in the model. For each device, several characteristics are shown in the model, including mechanical steps, electrical steps and electrical signal outputs. The electrical steps are shown superimposed on the mechanical steps, and electrical transitions link sequential electrical steps in time. Representations of conditions link the electrical transitions with signal outputs upon which the electrical transitions are conditioned.

26 Claims, 11 Drawing Sheets

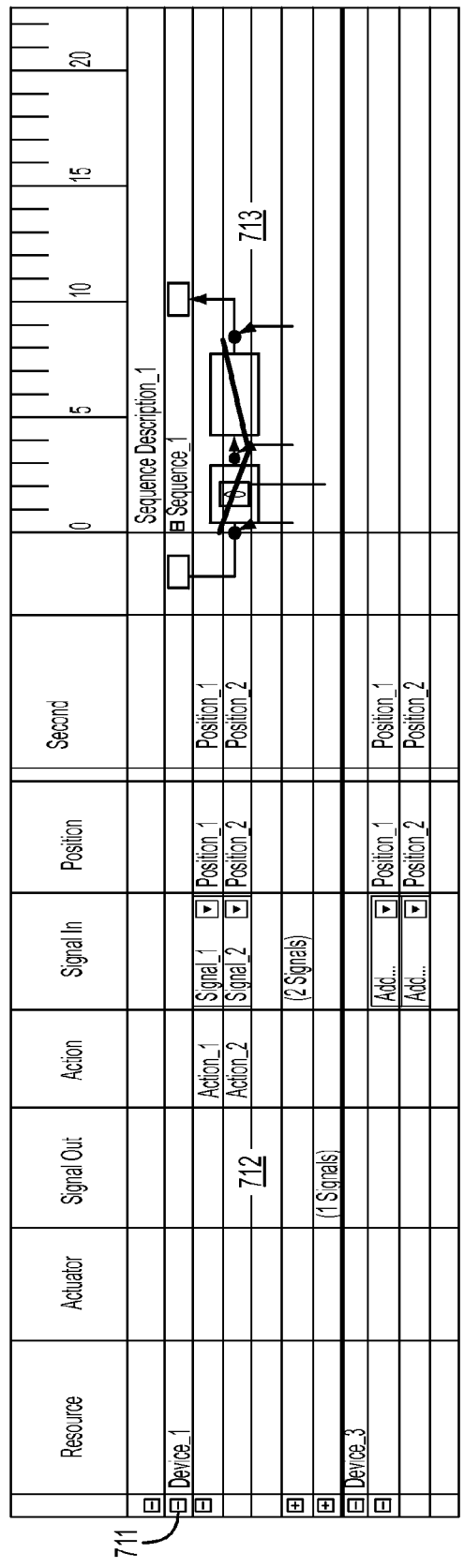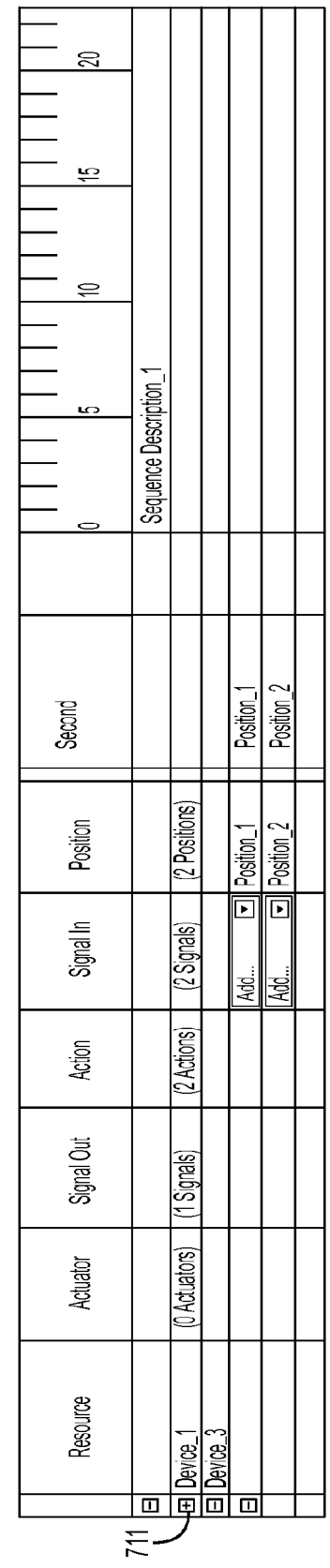
FIG. 7C
FIG. 7D

VISUALIZATION METHOD FOR ELECTRICAL MACHINE OPERATION MODELS BASED ON MECHANICAL MACHINE OPERATION MODELS

Claim of Priority

This application claims priority to, and incorporates by reference herein in its entirety, pending U.S. Provisional Patent Application Ser. No. 61/095,997, filed Sep. 11, 2008, and entitled "Visualization Method for Electrical-Machine-Operation-Models Based on Mechanical-Machine-Operation-Models," and is related to U.S. patent application Ser. No. 12/546,987, filed on the same date as the present application and entitled "Automated Derivation of a Logic-Controller-Behavior-Model from a Mechanical-Machine-Operation-Model."

FIELD OF THE DISCLOSURE

The present invention relates generally to the modeling of factory behavior for the purpose of factory automation. More specifically, the invention relates to techniques for visualizing an electrical machine operation model of logic controller behavior while also taking into account a model of mechanical machine operation on which the electrical machine operation model is based.

BACKGROUND

In the automation field, and more specifically during operational machine planning for a plant, an engineer traditionally creates a model that describes which machines will later be involved in the plant operation phase. Referring to FIG. 1A, the mechanical machine operation model 120 contains a detailed description of each step that each machine 115 performs in the operational process, as well as how those steps interact. The model is traditionally created in the form of a sequence diagram that shows machine behavior over time in a graphical format. Today, software tools provide meta-models for describing mechanical machine operation models and allow convenient graphical creation and editing of those mechanical models.

In order to program digital controllers to operate the machines, the mechanical machine operation model 120 is traditionally given to an engineer that is familiar with programmable logic controller (PLC) programming and he or she abstracts the mechanical model at 125 and creates at 127 a PLC program 128 that realizes the requirements described in the mechanical model 120. For example, the logic may include logic for starting/stopping signals for the machines in the correct timing, as well as safety critical features such as interlocks and timeout detection. The engineer typically adds sensors and actuators to the mechanical information as those are often missing in the mechanical model as provided to the engineer.

The abstraction of the mechanical model depends on the programming method the engineer chooses. Examples of methods for programming a PLC include STL (an assembler like language for Siemens PLCs), Ladder Logic and Step Chain Programming, the most advanced of the three. If a user chooses STL, the user must do the most abstraction since he must formulate a program with only basic instructions. For ladder logic, the user is assisted by a ladder diagram visual display of the logic. For step chain programming, the user must identify the steps in the program based on the mechanical description (i.e., the sequence diagram) and determine the exact sequence of the steps in the PLC, as well as identify the need for input signal conditions.

In each case, those traditional systems may be error-prone due to the required manual abstraction and the complexities faced by the engineer, and may be time-consuming for the same reasons. There is therefore presently a need for an improved technique of abstraction for use in formulating a PLC program from a mechanical machine operation model.

SUMMARY OF THE INVENTION

The present invention addresses the needs described above by providing, in one embodiment, a method for visually representing an electrical machine operation model on a display space. Using a computer connected to a display, the display space is apportioned into device subspaces, each subspace corresponding to a different device represented by the electrical machine operation model. For each device subspace, using a common time axis for all subspaces, the following steps are performed for a represented device: (1) a first region is created for displaying sequence information; (2) a second region is created for displaying signal information; (3) in the first region, a representation of mechanical device movement is displayed, including mechanical steps of the represented device as a function of time; (4) in the first region, representations of electrical steps are superimposed over the representation of mechanical device movement, each electrical step overlaying a corresponding mechanical step; and (5) in the second region, representations are displayed of electrical signal values of electrical signals associated with the represented device as a function of time. For all device subspaces collectively, the following steps are then performed: (1) each pair of electrical step representations that are sequential in time are connected, with a connection representing an electrical transition; and (2) for at least one representation of an electrical transition, at least one representation is displayed of a condition associating the electrical transition with a representation of an electrical signal.

Another embodiment of the invention is a computer-usable medium having computer readable instructions stored thereon for execution by a processor to perform methods as described above.

BRIEF DESCRIPTION OF THE DRAWINGS

FIGS. 7A-7D are schematic views showing selective collapsing of subregions of the visualization according to the present disclosure.

DESCRIPTION

Disclosed herein is a new technique for the visualization of an electrical machine operation model for use in formulating a PLC program from a mechanical machine operation model. The electrical model may be derived automatically or semi-automatically from a mechanical model. The electrical machine operation model streamlines and improves the efficiency of the engineering process that is used in the automation field to create PLC (Programmable Logic Controller) programs that control machines in a manufacturing plant, a factory, etc.

Figure 1A:
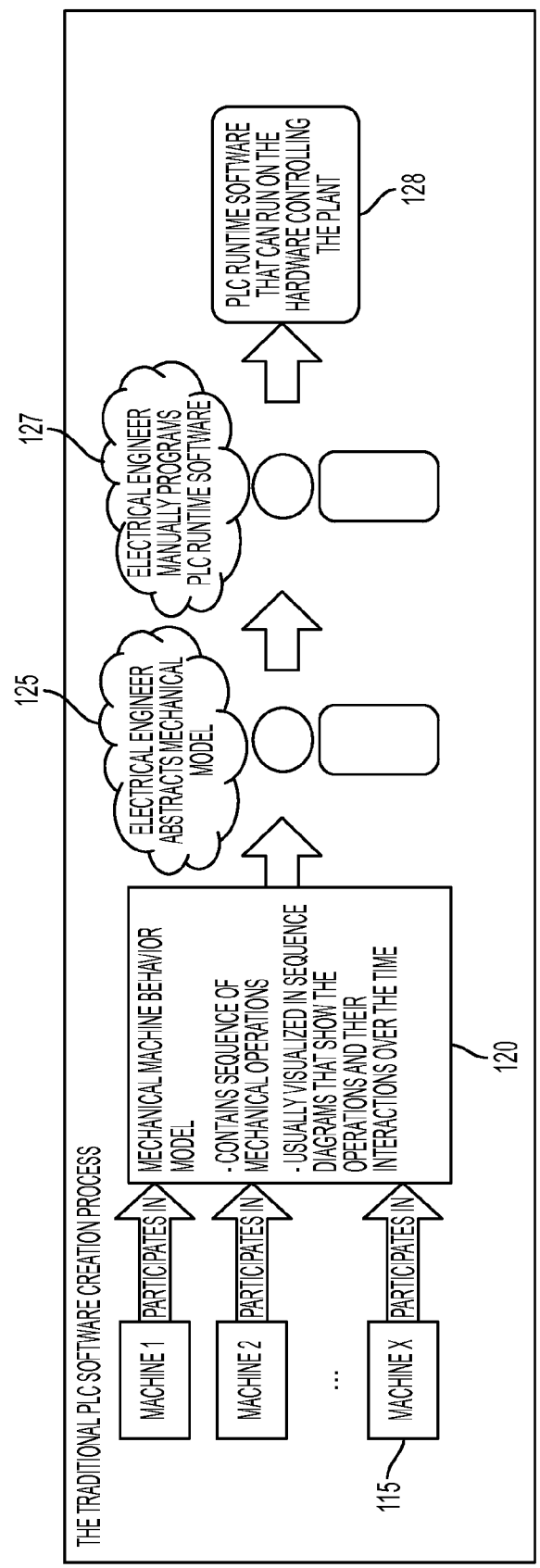
FIG. 1A is a schematic diagram showing a prior art PLC program creation process.
Figure 1B:
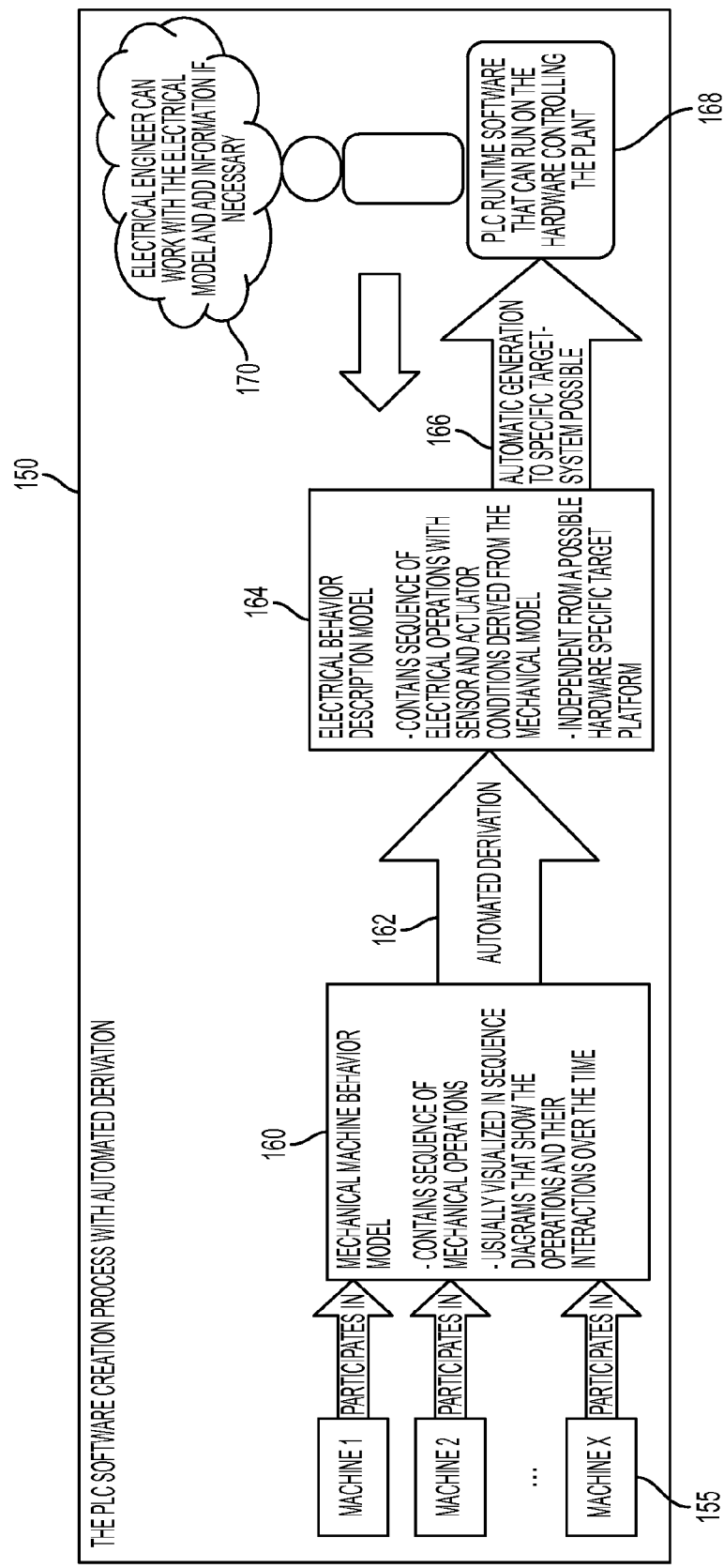
FIG. 1B is a schematic diagram showing a PLC program creation process in accordance with the present disclosure.

As shown in FIG. 1B, the electrical machine operation model 164 for which a visualization technique is disclosed herein may be used in an automatic generation process 150 for target-system-specific PLC programs 168. The process begins with a mechanical machine operation model 160 containing descriptions of each step performed by each machine 155, as well as how those steps interact. Using an automated or partially automated derivation process 162, the intermediate electrical machine operation model 164 is produced. The electrical machine operation model is visualized using the methods and systems described in the present disclosure. PLC runtime software 168 may then be automatically generated at 166 from the electrical machine operation model 164. The runtime software 168 is specifically targeted to the system used in controlling the plant. The electrical machine operation model may be modified manually at 170, using the presently described visualization technique, to add information such as interlocks and additional signal input conditions as well as signal outputs.

Electrical Machine Operation Model

The electrical machine operation model may be seen as a model that is between a PLC program and a mechanical machine operation model or sequence graph. Like the PLC program and mechanical machine operation model, it is a directed, non-circular graph where the nodes are called steps and the edges are called transitions.

Figure 2:
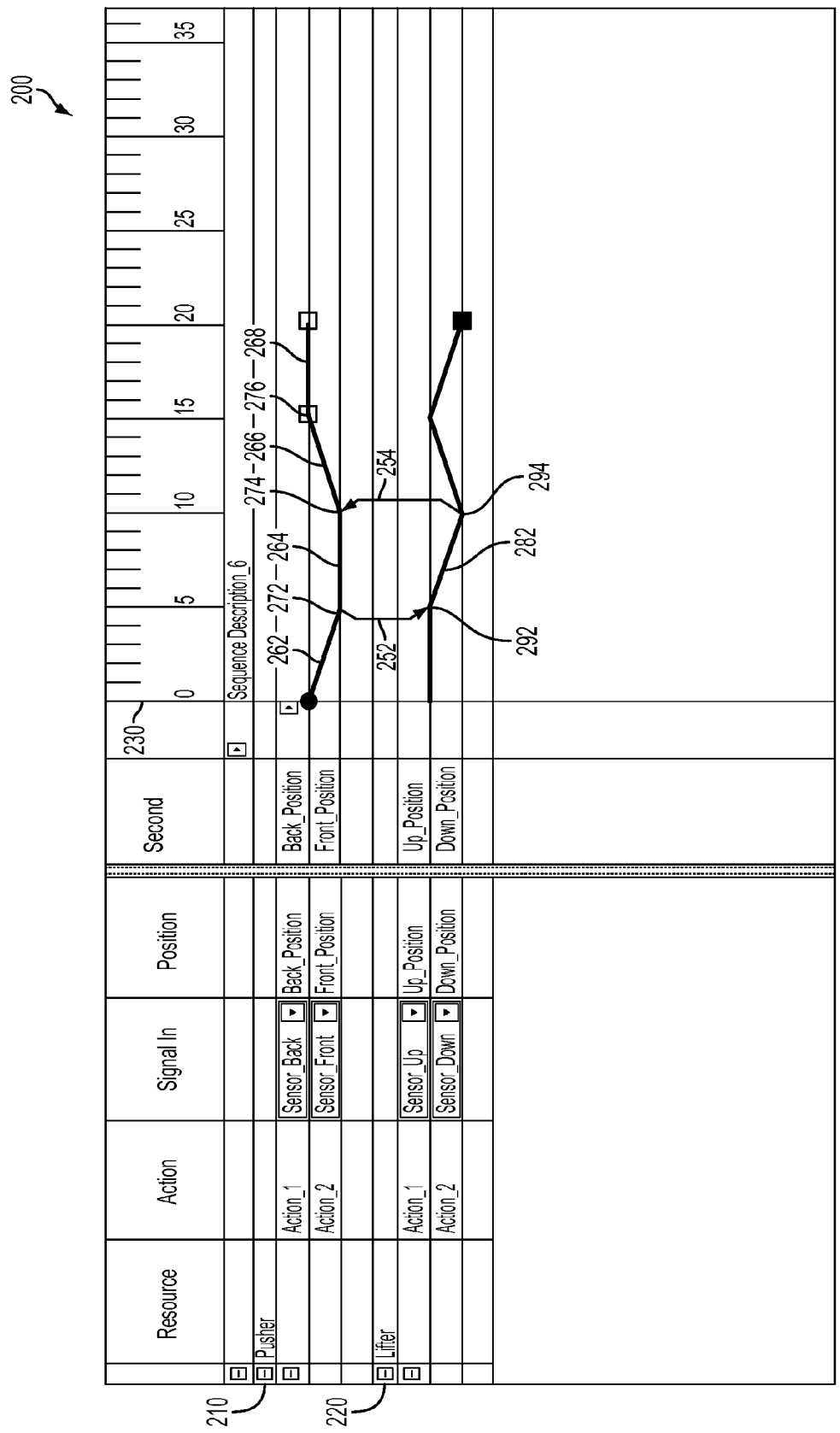
FIG. 2 is a sequence diagram showing an exemplary mechanical model in accordance with the present disclosure.
Figure 3:
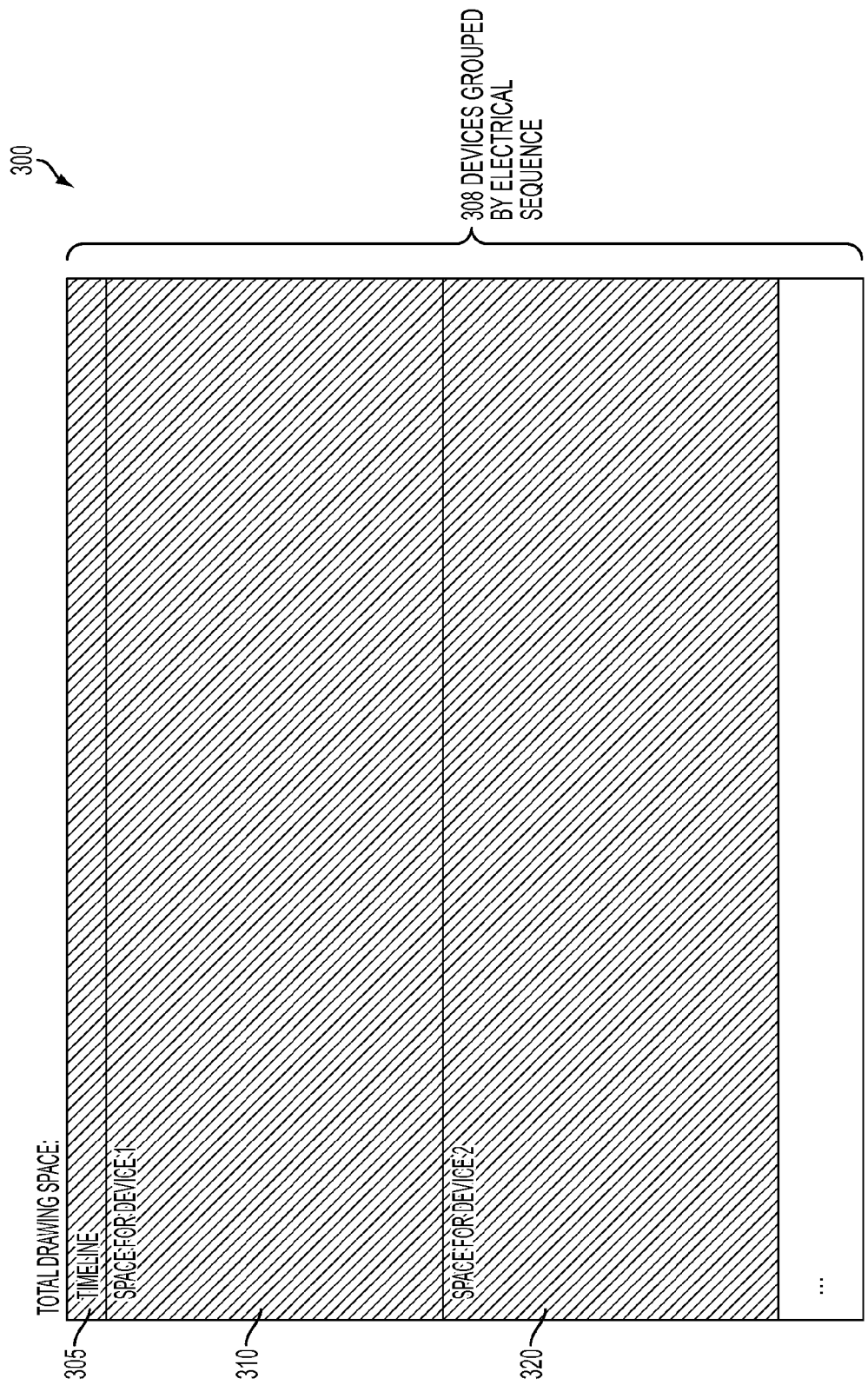
FIG. 3 is a schematic view showing the division of a display space into subspaces, according to the present disclosure.

To illustrate the technique for visualizing an electrical machine operation model as disclosed herein, an underlying mechanical machine operation model 200 will first be described with reference to FIG. 2. In FIG. 2, machines or devices are represented by a row in a chart, including the row 210 representing a pusher and the row 220 representing a lifter. The model also includes operational steps and transitions between the steps, shown as timing behavior in rows 210, 220 along a horizontal time line 230.

A mechanical step describes a change in the state of the machine. The state may, for example, be a physical position. Because a change in a state often represents a change in physical position, a state is often referred to as a "position." The changes in position are described in the timing behavior of the model. In the example model 200, the pusher represented in row 210 moves from a "back" position to a "front" position in step 262, remains in the "front" position during a waiting period 264, moves from the "front" position to the "back" position in step 266, and remains in the "back position during the waiting period 268. Changes in the position of the lifter between "up" and "down" are similarly represented in row 220.

In its simplest form, a mechanical machine operation model identifies only the start and end positions defining a change in position. The exact physical behavior between the start and end points, including intermediate positions, velocity and acceleration, is not described in the simplest case. For example, the straight line segments representing steps 262 and 266 do not represent information about the behavior of the devices between the start and end points of the steps. An expanded mechanical machine operation model, however, may accommodate such information. The information about the changes in position as well as the connected timing behavior can be grouped into an operation type—also called an "action." In sum, devices can perform actions, and each performance of an action is called a step.

The sequence of steps is defined by transitions. For example, the timing behavior of the pusher 210 includes a transition 272 between step 262 and step 264, a transition 274 between the waiting period 264 and step 266, and a transition 276 between step 266 and the waiting period 268.

The electrical machine operation model is based on the mechanical model. It also includes steps and transitions, but does not include actions. The steps of the electrical machine operation model may additionally include so-called waiting steps wherein a user can add waiting times in the electrical model. The transitions of the electrical machine operation model may be very different from those of the mechanical model, because it is possible for a user to represent one mechanical sequence with multiple electrical sequences. For example, a user may define one electrical sequence per device. An important difference between the electrical machine operation model and the mechanical model is the fact that the electrical machine operation model has information about electrical (sensor and actuator) signals. The electrical machine operation model stores conditions for those signals on transitions that are between electrical steps.

To create the electrical machine operation model, an engineer must define sensor signals associated with a machine. Those signals are logically connected to a mechanical position. For example, in the system shown in the diagram 200 of FIG. 2, when the pusher of row 210 completes step 262 and arrives at transition 272, a sensor signal, represented by arrow 252, is generated. That signal 252 satisfies a condition for the lifter of row 220 to leave transition 292 and perform step 282. Similarly, when the lifter of row 220 completes step 282 and arrives at transition 294, a sensor signal, represented by arrow 254, is generated. That signal 254 satisfies a condition for the pusher of row 210 to leave transition 274 and perform step 266.

As described below, the electrical machine operation model is created by creating electrical elements corresponding to the mechanical steps, signals and conditions. Electrical steps can also have interlock information, as well as additional signal output values. Those parameters may be added manually by an engineer using the visualization technique described herein.

The electrical machine operation model therefore includes electrical steps, transitions between the electrical steps, signals, conditions that store values for specific signals, signal output information and interlock information.

Visualizing the Electrical Machine Operation Model

Disclosed herein is a technique for visualizing the electrical machine operation model that reduces the amount of abstraction necessary for an engineer working with the transition of mechanical to electrical information. The visualization technique provides the engineer with information about the mechanical behavior as well as the resulting electrical behavior at the same time, without becoming unclear or obscure.

Embodiments of the invention provide methods, systems, and a computer useable medium storing computer-readable instructions for visualizing an electrical machine operation model. The invention may be implemented as a modular framework and deployed as software as an application program tangibly embodied on a program storage device. The application code may reside on a plurality of different types of computer readable media known to those skilled in the art.

Visualization may be performed on a two-dimensional (or three-dimensional) display space such as that of a computer or video display. The display may be part of a graphical user interface that may also include a keyboard, a mouse or other user interface devices, for interfacing with a computer. The display is controlled by one or more computers running one or more application programs for performing the described visualization methods.

In the following, the visualization concept is explained step by step by means of the concept drawings of FIGS. 3-6, showing various stages of an exemplary visualization. In the display space 300 of FIG. 3, a horizontal axis 305 represents time, as is the case in a traditional sequence diagram. The single time axis 305 is used in common by all elements of the visualization. Although shown as a horizontal axis, the time axis 305 may extend in another direction, such as the vertical direction.

The space 300 is divided into a plurality of subspaces including subspace 310 and subspace 320. Each of the subspaces 310, 320 represents a device or machine that is an element of the mechanical machine operation model upon which the visualization is based. Each of the subspaces 310, 320 utilizes the single time axis 305 in representing machine sequence information. The device subspaces 310, 320 are placed in a group 308 by their affiliation to a particular electrical sequence. Additional subspaces (not shown) that are affiliated with the same electrical sequence are placed in the same group as subspaces 310, 320. Other device subspaces (not shown) affiliated with another electrical sequence are separately grouped.

Figure 4:
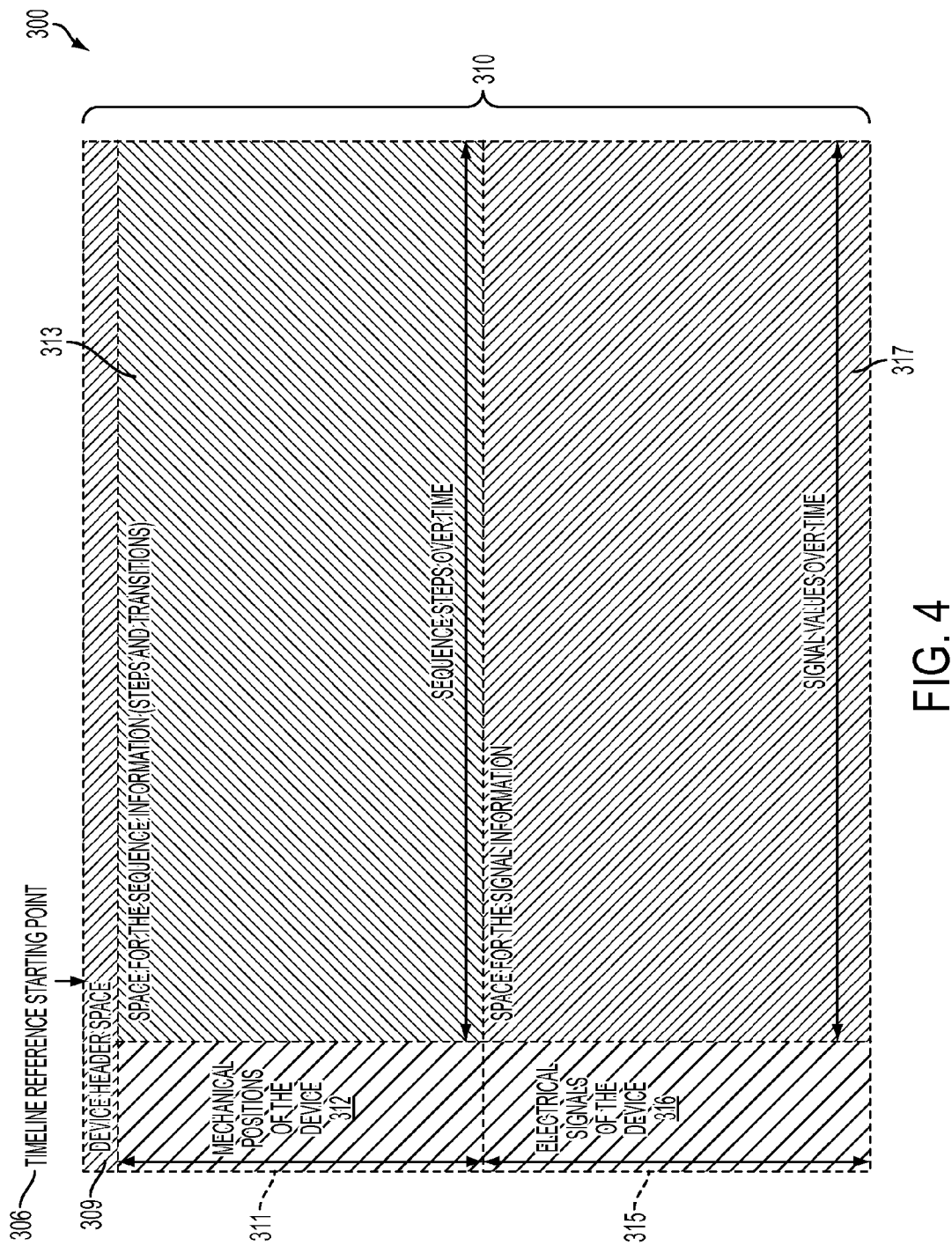
FIG. 4 is a schematic view of one subspace of a display space according to the invention.

The subspace 310 of the space 300, shown in more detail in FIG. 4, includes a device header space 309 for indicating the particular device described in the subspace. In the subspace 310, a first region 311 is created for displaying sequence information of the particular device, and a second region 315 is created for displaying signal information of the particular device. All important information (mechanical positions, steps, signals, signal values) for the particular device may thereby be integrated in the subspace 310. The first region 311 is additionally subdivided into a subregion 312 for defining the mechanical positions of the device as positions on a vertical axis, and a subregion 313 for depicting the sequence information for the device, including steps and transitions. The sequence information is depicted along the common timeline 305 (FIG. 3), beginning at a timeline reference starting point 306. The sequence may, for example, start at a timeline zero point, or may start at a particular time of day. For longer sequences, the subregion 313 may be scrolled left or right to view additional portions of the sequence. The second region 315 is subdivided into a subregion 316 for defining states of the electrical signals of the device as locations on a vertical axis, and a subregion 317 for depicting the signal information for the device.

Figure 5:
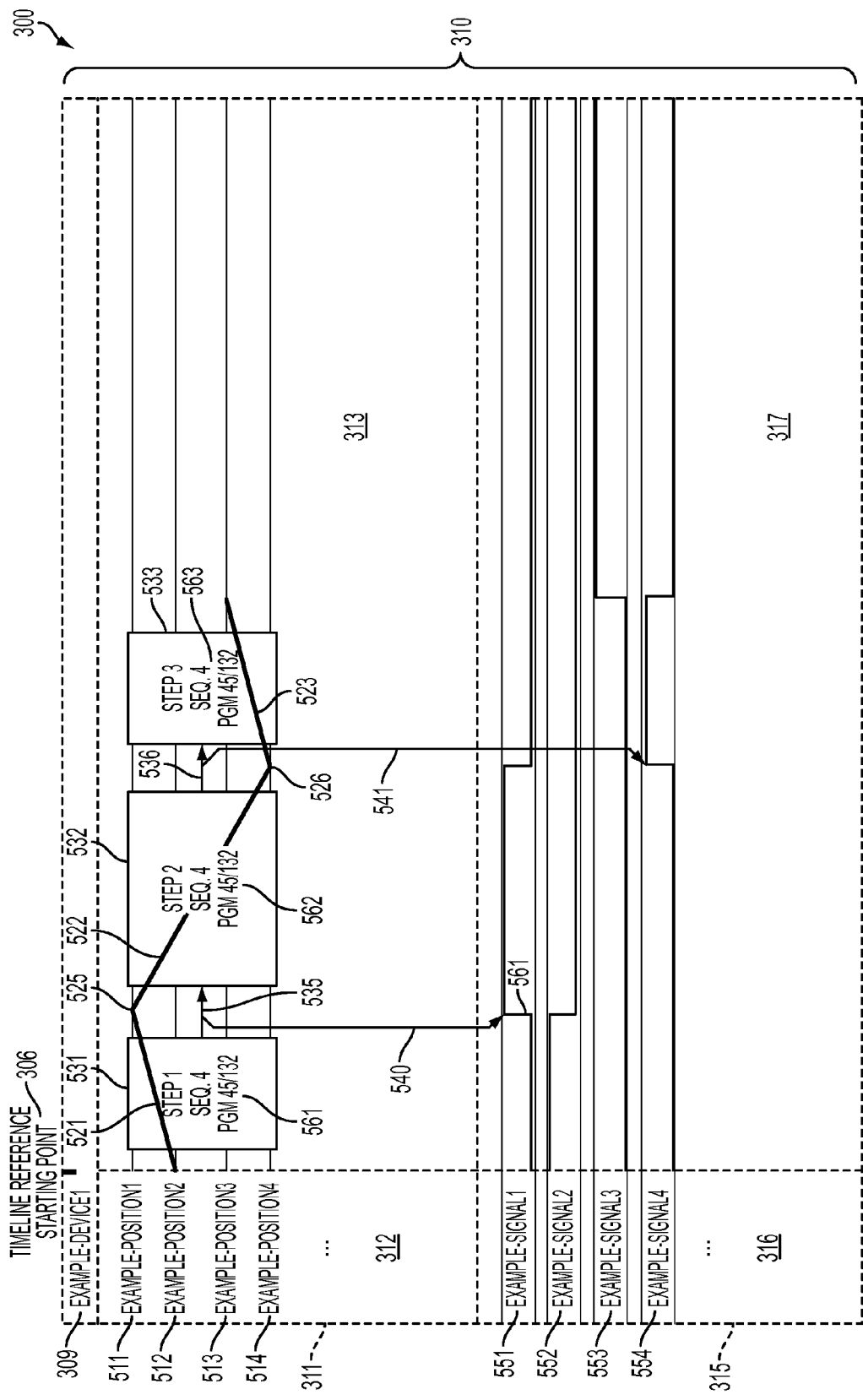
FIG. 5 is a schematic view of the subspace of FIG. 4 showing a model visualization according to the present disclosure.

As shown in FIG. 5, an exemplary electrical sequence, together with corresponding mechanical operations and the corresponding electrical signal values, are visualized in the device subspace 310 of space 300 for a particular device identified in the device header space 309.

An underlying mechanical machine operation model is represented in the region 311. The subregion 312 has been populated by four device positions 511-514 defined by four points along the vertical axis. The mechanical model, represented in subregion 313, includes operational steps 521, 522, 523 and transitions 525, 526 between the steps, which together represent timing behavior along the common horizontal time line having a zero point 306.

The example device represented in subspace 310 moves from position 512 to position 511 in step 521, then moves from position 511 to position 514 in step 522, and then moves from position 514 to position 513 in step 523.

Superimposed on the mechanical machine operation model are the electrical steps 531, 532, 533 of the electrical machine operation model. The connecting lines 535, 536 represent electrical transitions. In the diagram of FIG. 5, it can be seen that for each mechanical step 521, 522, 523 in the mechanical model, an electrical step 531, 532, 533 was created in the electrical machine operation model. For example, for the mechanical step 521, in which the device moves from position 512 to position 511, the corresponding electrical step 531 is created.

Additional information may be superimposed on the electrical steps. For example, the electrical steps 531, 532, 533 may include superimposed text 561, 562, 563 listing the step number, the step order in the particular sequence, and the assignment of steps or sequences to PLC-program blocks/modules.

For each mechanical transition on a particular step in the mechanical model, a corresponding electrical transition is created on the corresponding electrical step in the electrical model. For example, the electrical transition 535 is created on the electrical step 521 to correspond to the mechanical transition 525 on the mechanical step 521. The electrical transition 536 is similarly created to correspond to mechanical transition 526 of the mechanical model.

The representation of the device of subspace 310 also includes, in region 315, representations of sensor signals 551, 552, 553, 554. Each sensor is labeled in the subregion 316, and the sensor signals are represented in subregion 317. The sensor signals are represented using the time axis and timeline reference starting point 306 in common with the mechanical and electrical steps and transitions shown in region 311. States of the sensors, such as high/low, true/false and analog values, are defined by levels on the vertical axis.

The signals may be associated with a mechanical state/position of the device. The signal 551, for example, is associated with the end position of the mechanical step 521, wherein the device moves to position 511. In another example, the signal 554 is associated with the end position of the mechanical step 522, wherein the device moves to position 514.

The visualization of the electrical machine operation model shown in FIG. 5 also includes representations of conditions 540, 541 on the electrical transitions 535, 536. A condition makes an electrical transition conditional on a signal associated with an end position of the underlying mechanical step. For example, the condition 540 is created on the electrical transition 535 for the signal 551. In the embodiment shown in FIG. 5, the condition is represented by an arrow extending from the electrical transition 535 to a point 561 where the signal 551 becomes "true" or "high." One skilled in the art will recognize that a transition may also be conditioned on a signal becoming "false" or "low," as signal 552 does during the electrical transition 535.

The condition 540 requires that the electrical transition 535 cannot take place until the signal 551 becomes "true." In mechanical terms, the condition 540 requires that the described device be in position 511, as indicated by the signal 551, before the device begins the mechanical step of moving from position 511 to position 514.

Similarly, the condition 541 is created on the electrical transition 536 for the signal 554, requiring that the device be in position 514, as indicated by the signal 554, before the device begins the mechanical step of moving from position 514 to position 513.

The electrical machine operation model visualized by the technique of the present disclosure may be used in automatically or semi-automatically generating PLC software for use in an industrial application. While the intermediate electrical machine operation model is in a format that is independent of any proprietary or other PLC-specific language, the PLC software generated from that model may be generated in any format required by any particular PLC.

The visualization technique of the present disclosure permits the engineer to change or edit the conditions to evaluate alternatives. For example, the condition 540, shown in FIG. 5, may be edited by a user to make the electrical transition 535 conditional on the signal 552 becoming "low" instead of, or in addition to, the signal 551 becoming "high." The edited electrical machine operation model may then be evaluated and compared to the original electrical machine operation model, and a decision may be made whether to make the change permanent.

Figure 6:
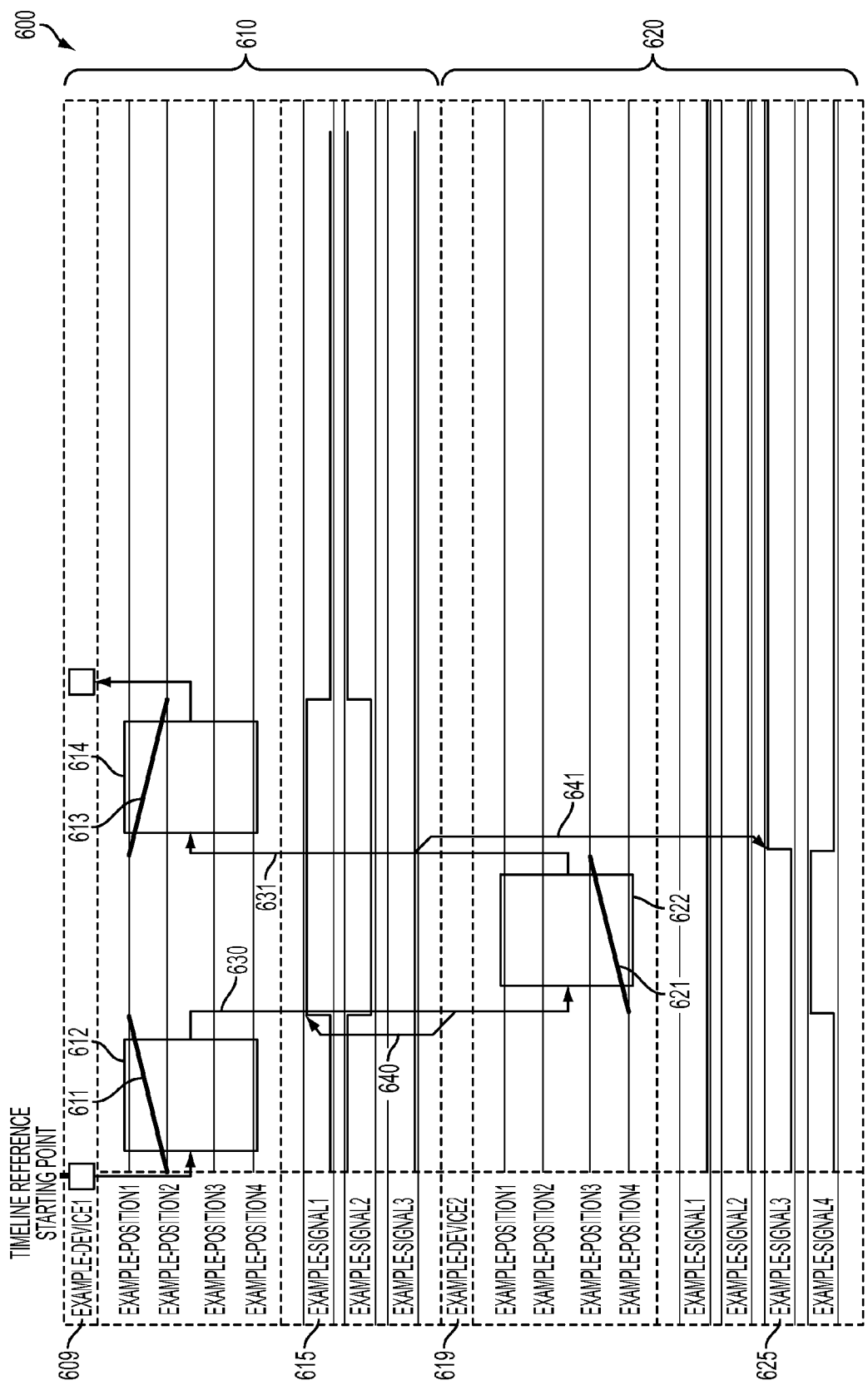
FIG. 6 is a schematic view of another display space showing a model visualization according to the present disclosure.

Multiple devices and their interrelationships may be visualized in a single space using the disclosed technique. For example, the display space 600, shown in FIG. 6, is divided into subspaces 610, 620. A device identified in the device header space 609 is represented in the subspace 610, and a device identified in the device header space 619 is represented in the subspace 620.

The device representation of subspace 610 includes two mechanical steps 611, 613. The electrical step 612 is superimposed on the underlying mechanical step 611, from which it was created. Similarly, the electrical step 614 is superimposed on the underlying mechanical step 613, from which it was created. The device representation of subspace 610 also includes signal representations, including a representation of signal 615, which becomes "high" after completion of the mechanical step 611.

The device representation of subspace 620 includes a mechanical step 621. The electrical step 622 is superimposed on the underlying mechanical step 621, from which it was created. The device representation of subspace 620 also includes signal representations including a representation of signal 625, which becomes "high" after completion of the mechanical step 621.

Unlike the electrical transitions of space 300 (FIG. 5), the electrical transitions 630, 631 shown in the space 600 (FIG. 6) connect electrical steps performed by different devices. For example, the electrical transition 630 connects the electrical step 612, performed by the device identified in the device header space 609, with the electrical step 622, performed by the device identified in the device header space 619. Similarly, the electrical transition 631 connects the electrical step 622 with the electrical step 614, performed by the device identified in the device header space 609.

Conditions are shown for each of the electrical transitions. The condition 640 makes the transition 630 conditional on the signal 615, while the condition 641 makes the transition 631 conditional on the signal 625. It can be seen that conditions may be represented in the space 600 whereby any transition may be made conditional on any related signal, regardless of the device with which the signal is associated. The conditions may be interactively changed by a user, for example, by dragging with a mouse, in order for a user to evaluate various configurations. While the transitions are shown conditional on changes in digital signal values, the transitions may alternatively be triggered by an analog signal reaching a threshold value.

While the space 600 contains only two subspaces 610, 620 representing two devices, a typical space contains more than two subspaces and may show a complex factory system containing a large number of subspaces representing a large number of machines. In accordance with one aspect of the invention, the individual devices as well as groups of devices may be reordered using a "drag and drop" graphical user interface technique, or other user interface techniques. In that way, machines may be reordered or regrouped in different electrical sequences to alter or to better show interrelationships.

In one embodiment, the overall visual complexity of a visualization may be reduced by selectively blending out certain parts of the visualization, such as condition connectors, transition lines or whole electrical sequences. That feature is particularly useful where large numbers of devices and steps make the visualization difficult to read. Certain features may then be blended in as needed to view the display. Color-coding may also be used to more easily identify features in the visualization. For example, the display may be color-coded according to type of feature, such as a mechanical step, an electrical transition, a condition, etc. Alternatively, each device and its associated elements may be visualized in a different color, to better relate conditions to the devices they affect.

Figure 7A:
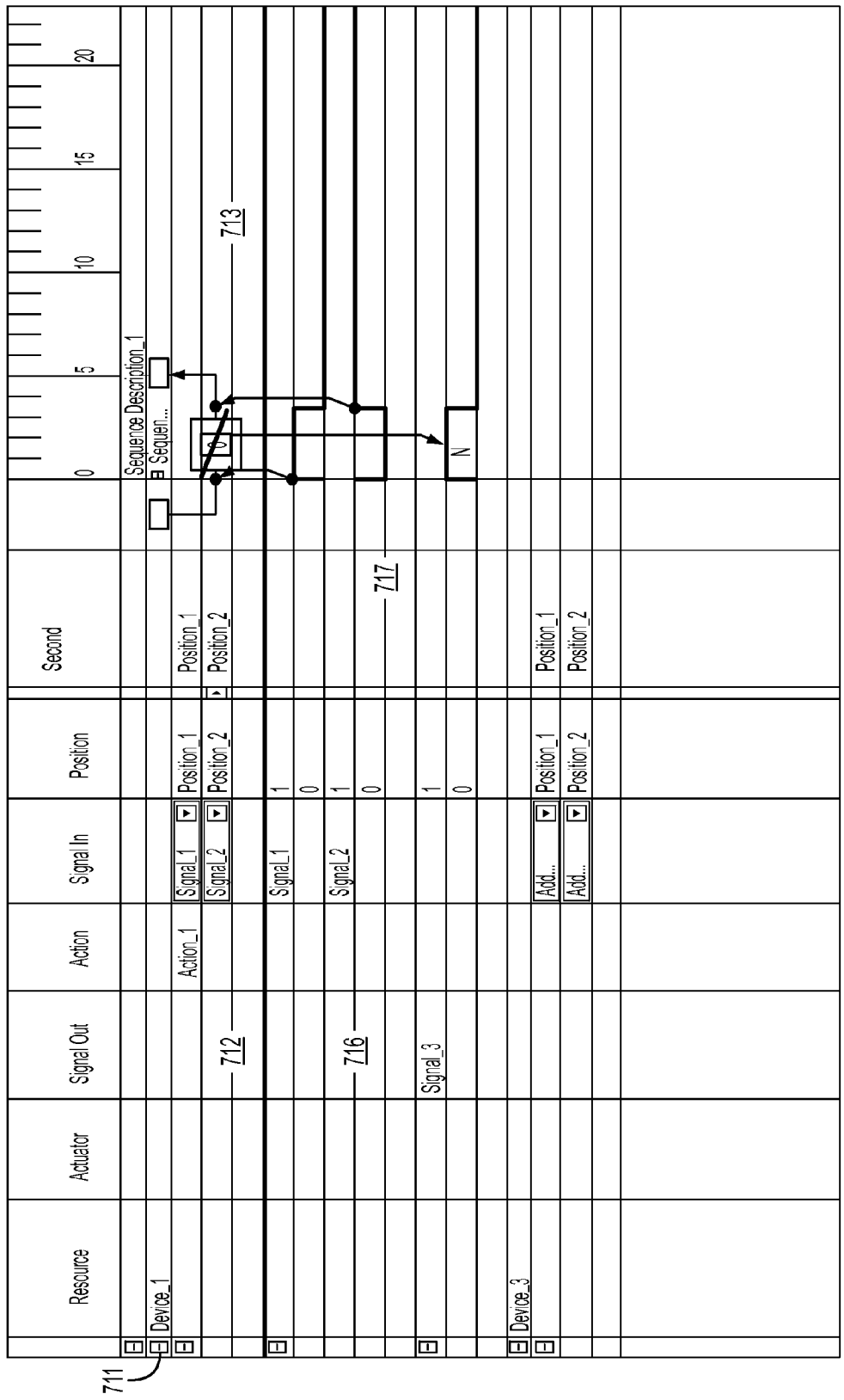
Figure 7B:
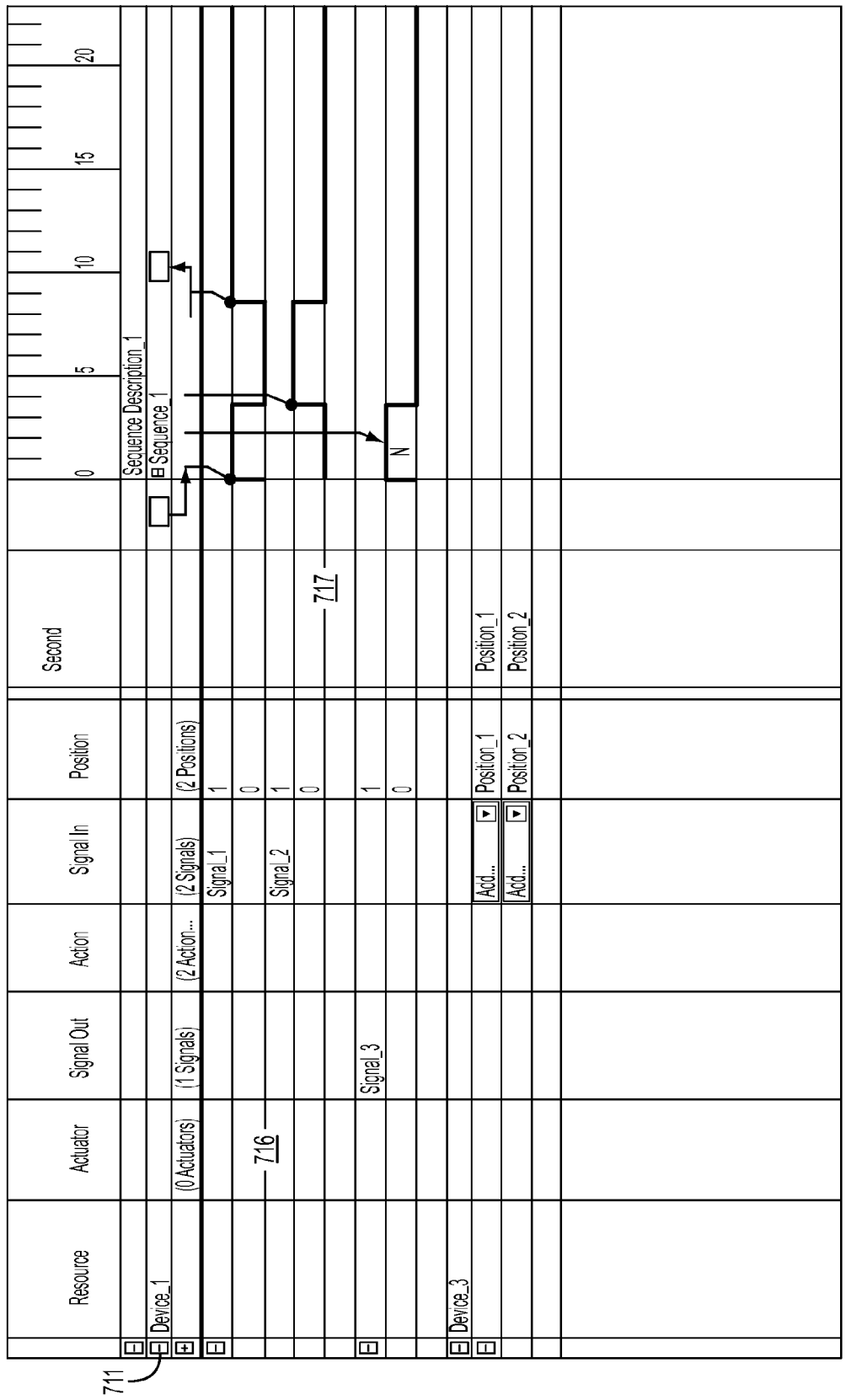

In one embodiment, regions of the display space containing information about one or more devices may be selectively collapsed. For example, referring to FIG. 7A, a region 711 displays information about device 1, including device positions and movements shown in subregions 712, 713, and device sensors and signals shown in subregions 716, 717. A user may selectively collapse the movement area of region 711, including subregions 712, 713, so that only the signal areas 716, 717 are displayed, as shown in FIG. 7B. A user may alternatively collapse the signal area display, including subregions 716, 717, so that only the movement areas 712, 713 are displayed, as shown in FIG. 7C. The entire region 711 may also be collapsed, as shown in FIG. 7D. By selectively collapsing subregions, the user may reduce the overall visual complexity of the visualization.

Figure 8:
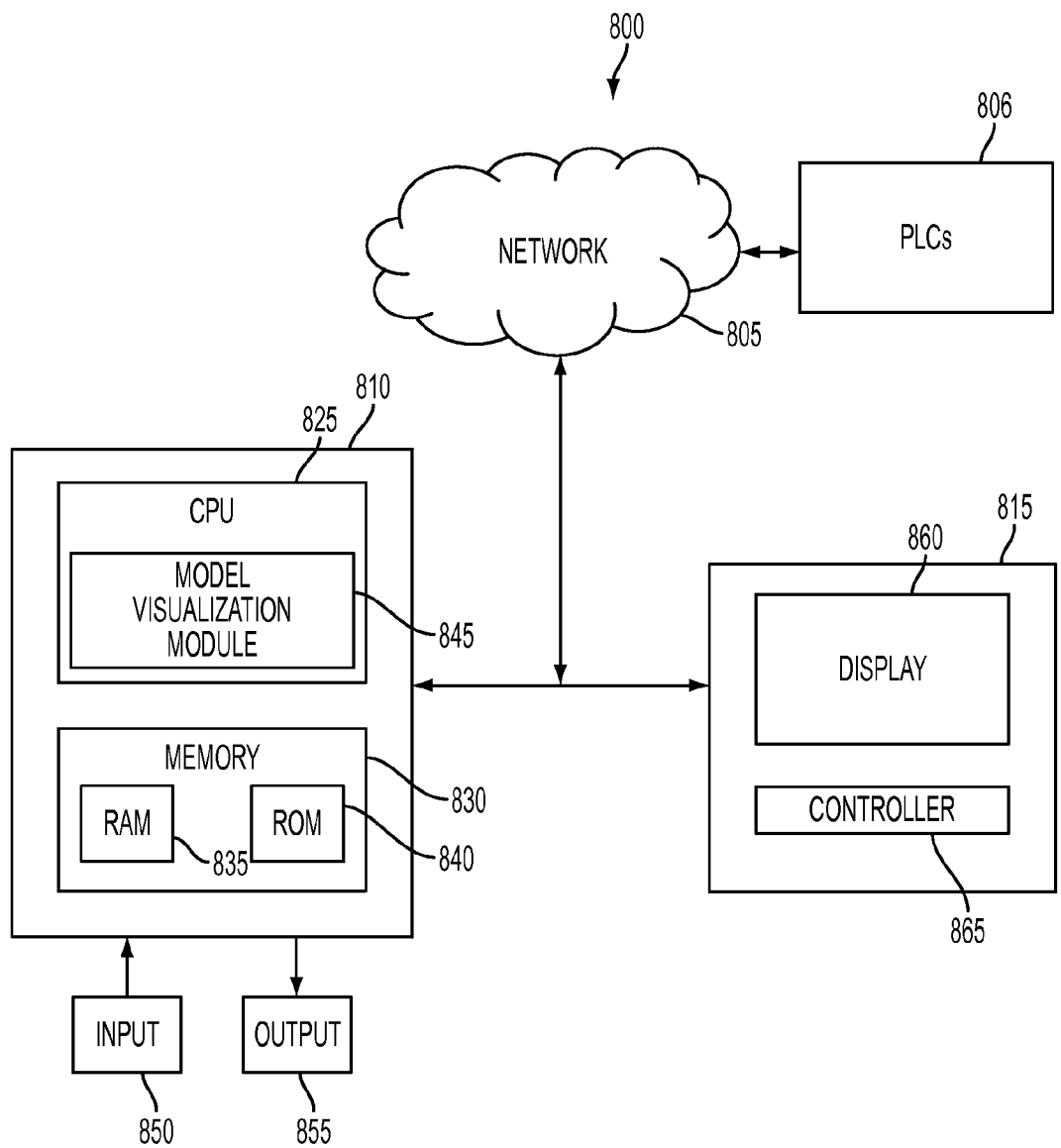
FIG. 8 is a schematic view showing a system according to the present disclosure.

The present invention may be embodied in a system for visualizing an electrical machine operation model. FIG. 8 illustrates a system 800 for visualizing an electrical machine operation model according to an exemplary embodiment of the present invention. As shown in FIG. 8, the system 800 includes a personal or other computer (PC) 810 and an operator's console 815. The system may be connected to one or more PLCs 806 over a wired or wireless network 805.

The PC 810, which may be a portable or laptop computer or a mainframe or other computer configuration, includes a central processing unit (CPU) 825 and a memory 830 connected to an input device 850 and an output device 855. The CPU 825 includes a model visualization module 845 and that includes one or more methods for visualizing an electrical machine operation model as discussed herein. Although shown inside the CPU 825, the model visualization module 845 can be located outside the CPU 825.

The memory 830 includes a random access memory (RAM) 835 and a read-only memory (ROM) 840. The memory 830 can also include a database, disk drive, tape drive, etc., or a combination thereof. The RAM 835 functions as a data memory that stores data used during execution of a program in the CPU 825 and is used as a work area. The ROM 840 functions as a program memory for storing a program executed in the CPU 825. The program may reside on the ROM 840 or on any other computer-usable medium as computer readable instructions stored thereon for execution by the CPU 825 or other processor to perform the methods of the invention. The input 850 is constituted by a keyboard, mouse, network interface, etc., and the output 855 is constituted by a liquid crystal display (LCD), cathode ray tube (CRT) display, printer, etc.

The operation of the system 800 can be controlled from the operator's console 815, which includes a controller 865, e.g., a keyboard, and a display 860. The operator's console 815 communicates with the PC 810 and through a network, a bus or other means so that a visualization created by the module 845 can be rendered by the PC 810 and viewed on the display 860. The PC 810 can be configured to operate and display information by using, e.g., the input 850 and output 855 devices to execute certain tasks. Program inputs, such as a mechanical machine operation model, may be input through the input 850 or may be stored in memory 830.

Conclusion

The visualization technique described herein provides for improved electrical machine operation planning. For example, the model is more easily understandable by a user because the visualizations of electrical steps for all devices are in the correct timing and are shown in connection with corresponding mechanical behavior. The model is also made clearer by the visualization of electrical signal conditions and their association with the electrical transitions between the steps, and by the visualization of expected signal values and conflicts in those expectations.

While the described visualization technique can help an engineer when drawn manually, a computer implemented version of the technique may be enhanced with several useful features. For example, interactive changes may be made to the model, such as changing the condition values. Complexity may be reduced by selective blend out or blend in of certain parts such as condition connectors or transition lines. Features such as devices and sequences may easily be reordered through drag and drop or other computer graphical user interface techniques. Algorithms may be used to simplify and/or automate parts of the creation of the electrical or mechanical model. Real-time machine process monitoring in the operational phase of a plant may be incorporated into the same view.

The present invention provides a tool that permits visualization of all important aspects of electrical machine planning for a plant in a single drawing. Less abstraction is therefore required, leading to the faster design of PLC programs. The clearer visualization helps to identify errors in earlier stages of the development and thus reduces testing time and effort. It is expected that work-in time for an existing machine operation processes will be reduced if plans with the new visualization technique exist.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for visually representing an electrical machine operation model on a display space, the method comprising;
   (A) using a computer connected to a display, apportioning the display space into device subspaces, each subspace corresponding to a different device represented by the electrical machine operation model;
   (B) for each device subspace, using a common time axis for all subspaces, performing the following for a represented device:
      (1) creating a first region for displaying sequence information;
      (2) creating a second region for displaying signal information;
      (3) in the first region, displaying a representation of mechanical device movement including mechanical steps of the represented device as a function of time;
      (4) in the first region, superimposing over the representation of mechanical device movement, representations of electrical steps, each representation of an electrical step overlaying a corresponding representation of a mechanical step, each electrical step representing information about plural sensor and actuator signals during a time period and derived from the mechanical model; and
      (5) in the second region, displaying representations of electrical signal values of electrical signals associated with the represented device as a function of time; and
   (C) for all device subspaces collectively, performing the following:
      (1) connecting each pair of electrical step representations that are sequential in time, with a graphical connection representing an electrical transition in which a state of the plural sensor and actuator signals changes from that of an earlier electrical step to that of a later electrical step; and
      (2) for at least one representation of an electrical transition, displaying at least one representation of a condition graphically connecting the representation of the electrical transition with one of the representations of electrical signal values upon which the transition is conditioned.

2. The method of claim 1, wherein the device subspaces are horizontal partitions of the display space.

3. The method of claim 2, wherein time is represented in the display space as a horizontal axis.

4. The method of claim 1, wherein the representation of mechanical device movement in the display space is a series of connected line segments, each segment representing a mechanical step.

5. The method of claim 4, wherein at least one mechanical step is represented by a line segment having end points representing real device positions.

6. The method of claim 5, wherein the line segment has at least one intermediate point representing a real device position.

7. The method of claim 1, wherein the representation of a condition is a line connecting an electrical transition with a point on a representation of an electrical signal.

8. The method of claim 1, wherein the representation of an electrical signal includes a transition between two sensor states at a point on the common time axis.

9. The method of claim 1, further comprising the following for all device subspaces collectively:
   (3) adding interlock information by creating additional conditions.

10. The method of claim 1, further comprising the following for all device subspaces collectively:
    (3) adding signal output values to one or more electrical steps.

11. The method of claim 1, further comprising the following for all device subspaces collectively:

(3) changing an order in which the device subspaces appear in the display, based on an interactive user input to the computer.

12. The method of claim 1, further comprising the following for all device subspaces collectively:
(3) changing a condition by changing one of the associated electrical transition and the representation of an electrical signal, based on an interactive user input to the computer.

13. The method of claim 1, further comprising the following for all device subspaces collectively;
(3) blending out of the display all representations of a type selected from the group consisting of: a representation of a mechanical device movement, a representation of an electrical step, a representation of an electrical signal value, a representation of an electrical transition, and a representation of a condition.

14. A non-transitory computer-usable medium having computer readable instructions stored thereon for execution by a processor to perform a method for visually representing an electrical machine operation model on a display space, the method comprising:
(A) apportioning the display space into device subspaces, each subspace corresponding to a different device represented by the electrical machine operation model;
(B) for each device subspace, using a common time axis for all subspaces, performing the following for a represented device:
(1) creating a first region for displaying sequence information;
(2) creating a second region for displaying signal information;
(3) in the first region, displaying a representation of mechanical device movement including mechanical steps of the represented device as a function of time;
(4) in the first region, superimposing over the representation of mechanical device movement, representations of electrical steps, each presentation of an electrical step overlaying a corresponding representation of a mechanical step, each electrical step representing information about plural sensor and actuator signals during a time period and derived from the mechanical model; and
(5) in the second region, displaying representations of electrical signal values of electrical signals associated with the represented device as a function of time; and
(C) for all device subspaces collectively, performing the following:
(1) connecting each pair of electrical step representations that are sequential in time, with a graphical connection representing an electrical transition in which a state of the plural sensor and actuator signals changes from that of an earlier electrical step to that of a later electrical step; and
(2) for at least one representation of an electrical transition, displaying at least one representation of a condition graphically connecting the representation of the electrical transition with one of the representations of electrical signal values upon which the transition is conditioned.

15. The non-transitory computer-usable medium of claim 14, wherein the device subspaces are horizontal partitions of the display space.

16. The non-transitory computer-usable medium of claim 15, wherein time is represented in the display space as a horizontal axis.

17. The non-transitory computer-usable medium of claim 14, wherein the representation of mechanical device movement in the display space is a connected series of line segments, each segment representing a mechanical step.

18. The non-transitory computer-usable medium of claim 17, wherein at least one mechanical step is represented by a line segment having end points representing real device positions.

19. The non-transitory computer-usable medium of claim 18, wherein the line segment has at least one intermediate point representing a real device position.

20. The non-transitory computer-usable medium of claim 14, wherein the representation of a condition is a line connecting an electrical transition with a point on a representation of an electrical signal.

21. The non-transitory computer-usable medium of claim 14, wherein the representation of an electrical signal includes a transition between two sensor states at a point on the common time axis.

22. The non-transitory computer-usable medium of claim 14, wherein the method further comprises the following for all device subspaces collectively:
(3) adding interlock information by creating additional conditions.

23. The non-transitory computer-usable medium of claim 14, wherein the method further comprises the following for all device subspaces collectively:
(3) adding signal output values to one or more electrical steps.

24. The non-transitory computer-usable medium of claim 14, wherein the method further comprises the following for all device subspaces collectively:
(3) changing an order in which the device subspaces appear in the display, based on an interactive user input to the computer.

25. The non-transitory computer-usable medium of claim 14, wherein the method further comprises the following for all device subspaces collectively:
(3) changing a condition by changing one of the associated electrical transition and the representation of an electrical signal, based on an interactive user input to the computer.

26. The non-transitory computer-usable medium of claim 14, wherein the method further comprises the following for all device subspaces collectively:
(3) based on an interactive user input to the computer, blending out of the display all representations of a type selected from the group consisting of: a representation of a mechanical device movement, a representation of an electrical step, a representation of an electrical signal value, a representation of an electrical transition, and a representation of a condition.

* * * * *